(12) United States Patent
Ogasawara et al.

(10) Patent No.: US 12,505,544 B2
(45) Date of Patent: Dec. 23, 2025

(54) IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventors: Aya Ogasawara, Tokyo (JP); Akimichi Ichinose, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 430 days.

(21) Appl. No.: 18/338,324

(22) Filed: Jun. 20, 2023

(65) Prior Publication Data

US 2024/0037739 A1   Feb. 1, 2024

(30) Foreign Application Priority Data

Jul. 29, 2022   (JP) .................... 2022-121977

(51) Int. Cl.
  *G06T 7/00*   (2017.01)

(52) U.S. Cl.
  CPC .. *G06T 7/0012* (2013.01); *G06T 2207/30096* (2013.01)

(58) Field of Classification Search
  CPC ......... G06T 7/0012; G06T 2207/30096; G06T 2207/10072; G06T 2207/20081; G06T 2207/20084
  See application file for complete search history.

(56) References Cited

U.S. PATENT DOCUMENTS

| 2018/0300878 | A1 | 10/2018 | Ihara | |
| 2020/0342990 | A1* | 10/2020 | Ichinose | ............... G16H 50/20 |
| 2022/0392619 | A1* | 12/2022 | Ichinose | ................. G06T 1/00 |

FOREIGN PATENT DOCUMENTS

JP   2018175343   11/2018

* cited by examiner

*Primary Examiner* — Kent Yip
(74) *Attorney, Agent, or Firm* — JCIPRNET

(57) ABSTRACT

A processor derives a feature amount related to an input image based on first to nth (n≥2) derivation models, derives, via the first derivation model, a first feature amount based on the input image, and derives, via a kth (1<k≤n) derivation model, a kth feature amount based on the input image and a k−1th feature amount derived by a k−1th derivation model. An nth feature amount derived by the nth derivation model is the feature amount related to the input image, and the k−1th feature amount includes a feature amount related to another region that is independent of a region related to the kth feature amount, which suggests the kth feature amount derived by the kth derivation model, and that serves as a basis for the derivation of the kth feature amount.

10 Claims, 12 Drawing Sheets

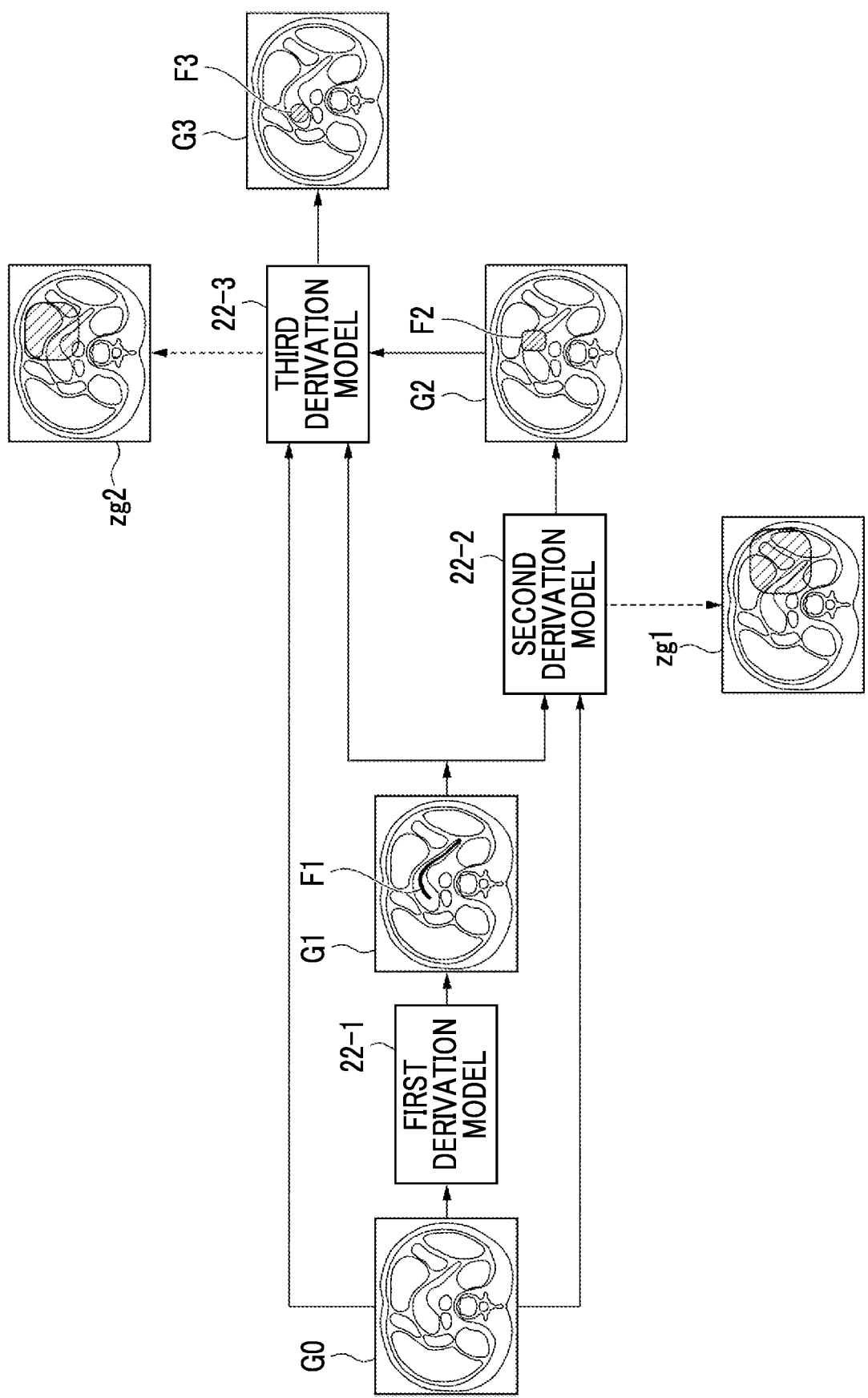

IMAGE PROCESSING APPARATUS, IMAGE PROCESSING METHOD, AND IMAGE PROCESSING PROGRAM

CROSS REFERENCE TO RELATED APPLICATIONS

The present application claims priority from Japanese Patent Application No. 2022-121977, filed on Jul. 29, 2022, the entire disclosure of which is incorporated herein by reference.

BACKGROUND

Technical Field

The present disclosure relates to an image processing apparatus, an image processing method, and an image processing program.

Related Art

In recent years, with the progress of medical devices, such as a computed tomography (CT) apparatus and a magnetic resonance imaging (MRI) apparatus, it is possible to make an image diagnosis by using a medical image having a higher quality and a higher resolution. In addition, computer-aided diagnosis (CAD), in which the presence probability, positional information, and the like of a lesion are derived by analyzing the medical image and presented to a doctor, such as an image interpretation doctor, is put into practical use.

For example, JP2018-175343A proposes a method in which a first discriminator that discriminates a lesion region candidate in a medical image and a second discriminator that discriminates whether the lesion region candidate discriminated by the first discriminator is a blood vessel region or a bronchial region are provided, and a lesion region candidate, which is not discriminated as the blood vessel region or the bronchial region by the second discriminator, is detected as a lesion region.

In some cases, the lesion is not clearly shown on the medical image depending on a type and a size of the lesion or a method of capturing the medical image. For example, a tumor related to pancreatic cancer is relatively clearly shown in a contrast tomographic image of an abdomen, but the tumor related to the pancreatic cancer is hardly shown in a non-contrast tomographic image. In some cases, the doctor finds such a hardly shown lesion by using an indirect finding shown in the medical image as a clue. The indirect finding represents a feature of at least one of a property or a shape of peripheral tissue of the lesion, which appears with the development of the lesion. Examples of the indirect finding include atrophy, swelling, and calcification.

Since the CAD in the related art is developed on the premise that the lesion is clearly shown on the medical image to some extent, it is difficult to find the lesion that is hardly shown as described above. For this reason, there is a demand for the development of the CAD based on the above-described thought of the doctor, that is, finding the lesion that is hardly shown by using the indirect finding as a clue.

SUMMARY OF THE INVENTION

The present disclosure has been made in view of the above circumstances, and is to accurately derive a feature of an input image according to a method based on the thought of a person who views the input image, such as a doctor.

The present disclosure relates to an image processing apparatus comprising at least one processor, in which the processor derives a feature amount related to an input image based on first to nth ($n \geq 2$) derivation models, derives, via the first derivation model, a first feature amount based on the input image, and derives, via a kth ($1 < k \leq n$) derivation model, a kth feature amount based on the input image and a k−1th feature amount derived by a k−1th derivation model, an nth feature amount derived by the nth derivation model is the feature amount related to the input image, and the k−1th feature amount includes a feature amount related to another region that is independent of a region related to the kth feature amount, which suggests the kth feature amount derived by the kth derivation model, and that serves as a basis for the derivation of the kth feature amount.

It should be noted that, in the image processing apparatus according to the present disclosure, the kth derivation model may be trained to correct the region that serves as the basis for the derivation of the kth feature amount based on the k−1th feature amount.

In this case, the correction may be emphasis.

In addition, in the image processing apparatus according to the present disclosure, the input image may be a medical image, and the feature amount related to the input image may represent an evaluation result of an abnormality included in the medical image.

In addition, in the image processing apparatus according to the present disclosure, the evaluation result may include at least one of a region of a lesion included in the input image, a probability that the lesion is a specific disease, presence or absence of the lesion, or a malignancy degree of the lesion.

In addition, in the image processing apparatus according to the present disclosure, the k−1th feature amount derived by the k−1th derivation model may include a feature amount related to a region other than the lesion.

In addition, in the image processing apparatus according to the present disclosure, the feature amount related to the region other than the lesion may be a feature amount that represents at least one of a property or a shape of the region other than the lesion.

In addition, in the image processing apparatus according to the present disclosure, the processor may display the input image by emphasizing the other region that serves as the basis for the derivation of the kth feature amount in the input image.

The present disclosure relates to an image processing method comprising deriving a feature amount related to an input image based on first to nth ($n \geq 2$) derivation models, deriving, via the first derivation model, a first feature amount based on the input image, and deriving, via a kth ($1 < k \leq n$) derivation model, a kth feature amount based on the input image and a k−1th feature amount derived by a k−1th derivation model, in which an nth feature amount derived by the nth derivation model is the feature amount related to the input image, and the k−1th feature amount includes a feature amount related to another region that is independent of a region related to the kth feature amount, which suggests the kth feature amount derived by the kth derivation model, and that serves as a basis for the derivation of the kth feature amount.

The present disclosure relates to an image processing program causing a computer to execute a procedure of deriving a feature amount related to an input image based on first to nth ($n \geq 2$) derivation models, a procedure of deriving, via the first derivation model, a first feature amount based on the input image, and a procedure of deriving, via a kth ($1<k\le n$) derivation model, a kth feature amount based on the input image and a k−1th feature amount derived by a k−1th derivation model, in which an nth feature amount derived by the nth derivation model is the feature amount related to the input image, and the k−1th feature amount includes a feature amount related to another region that is independent of a region related to the kth feature amount, which suggests the kth feature amount derived by the kth derivation model, and that serves as a basis for the derivation of the kth feature amount.

According to the present disclosure, it is possible to accurately derive the feature of the input image.

BRIEF DESCRIPTION OF THE DRAWINGS

FIG. 13 is a diagram showing an example of visualizing and displaying a latent expression.

DETAILED DESCRIPTION

Figure 1:
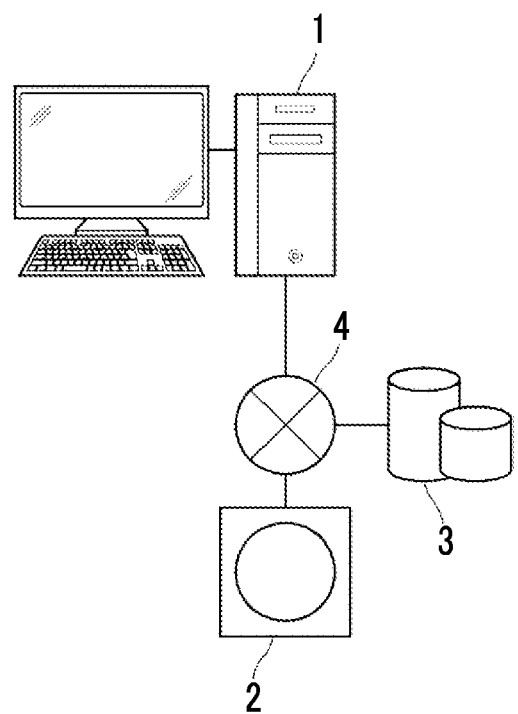
FIG. 1 is a diagram showing a schematic configuration of a diagnosis support system to which an image processing apparatus according to an embodiment of the present disclosure is applied.

Hereinafter, an embodiment of the present disclosure will be described with reference to the drawings. First, a configuration of a medical information system to which an image processing apparatus according to the present embodiment is applied will be described. FIG. 1 is a diagram showing a schematic configuration of the medical information system. In the medical information system shown in FIG. 1, a computer 1 including the image processing apparatus according to the present embodiment, an imaging apparatus 2, and an image storage server 3 are connected via a network 4 in a communicable state.

The computer 1 includes the image processing apparatus according to the present embodiment, and an image processing program according to the present embodiment is installed in the computer 1. The computer 1 may be a workstation or a personal computer directly operated by a doctor who makes a diagnosis, or may be a server computer connected to the workstation or the personal computer via the network. The image processing program is stored in a storage device of the server computer connected to the network or in a network storage to be accessible from the outside, and is downloaded and installed in the computer 1 used by the doctor, in response to a request. Alternatively, the image processing program is distributed in a state of being recorded on a recording medium, such as a digital versatile disc (DVD) or a compact disc read only memory (CD-ROM), and is installed in the computer 1 from the recording medium.

The imaging apparatus 2 is an apparatus that images a diagnosis target part of a subject to generate a three-dimensional image showing the part and is, specifically, a CT apparatus, an MRI apparatus, a positron emission tomography (PET) apparatus, and the like. The three-dimensional image consisting of a plurality of tomographic images generated by the imaging apparatus 2 is transmitted to and stored in the image storage server 3. It should be noted that, in the present embodiment, the imaging apparatus 2 is a CT apparatus, and a CT image of an abdomen of the subject is generated as the three-dimensional image. It should be noted that the acquired CT image may be a contrast CT image or a non-contrast CT image.

The image storage server 3 is a computer that stores and manages various data, and comprises a large-capacity external storage device and database management software. The image storage server 3 communicates with another device via the wired or wireless network 4, and transmits and receives image data and the like to and from the other device. Specifically, the image storage server 3 acquires various data including the image data of the CT image generated by the imaging apparatus 2 via the network, and stores and manages the various data in the recording medium, such as the large-capacity external storage device. It should be noted that the storage format of the image data and the communication between the devices via the network 4 are based on a protocol, such as digital imaging and communication in medicine (DICOM).

Figure 2:
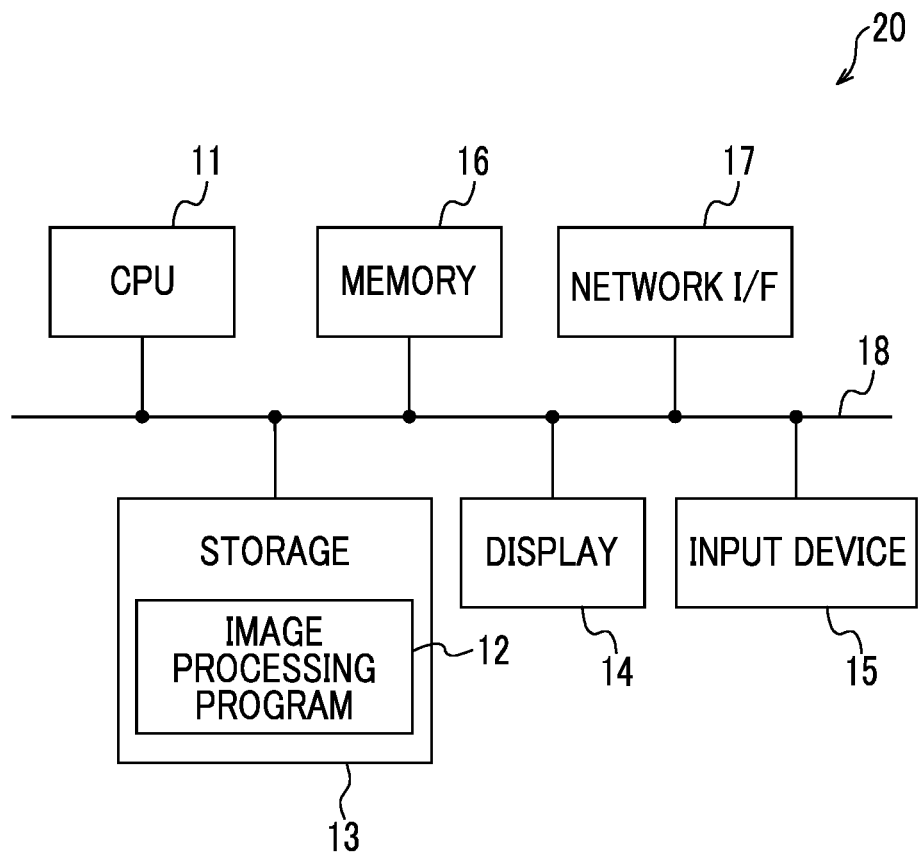
FIG. 2 is a diagram showing a hardware configuration of the image processing apparatus according to the present embodiment.

Next, the image processing apparatus according to the present embodiment will be described. FIG. 2 is a diagram showing a hardware configuration of the image processing apparatus according to the present embodiment. As shown in FIG. 2, the image processing apparatus 20 includes a central processing unit (CPU) 11, a non-volatile storage 13, and a memory 16 as a transitory storage region. Moreover, the image processing apparatus 20 includes a display 14, such as a liquid crystal display, an input device 15, such as a keyboard and a mouse, and a network interface (I/F) 17 connected to the network 4. The CPU 11, the storage 13, the display 14, the input device 15, the memory 16, and the network I/F 17 are connected to a bus 18. It should be noted that the CPU 11 is an example of a processor according to the present disclosure.

The storage 13 is realized by a hard disk drive (HDD), a solid state drive (SSD), a flash memory, and the like. An image processing program 12 is stored in the storage 13 as a storage medium. The CPU 11 reads out the image processing program 12 from the storage 13, develops the image processing program 12 in the memory 16, and executes the developed image processing program 12.

Figure 3:
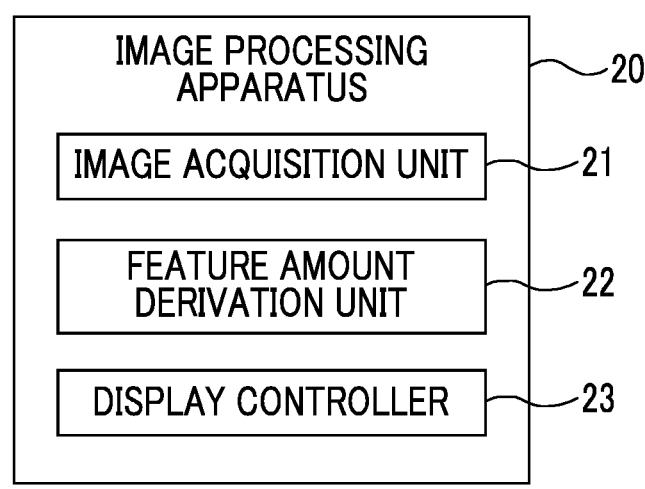
FIG. 3 is a functional configuration diagram of the image processing apparatus according to the present embodiment.

Hereinafter, a functional configuration of the image processing apparatus according to the present embodiment will be described. FIG. 3 is a diagram showing the functional configuration of the image processing apparatus according to the present embodiment. As shown in FIG. 3, the image processing apparatus 20 comprises an image acquisition unit 21, a feature amount derivation unit 22, and a display controller 23. By executing the image processing program 12 by the CPU 11, the CPU 11 functions as the image acquisition unit 21, the feature amount derivation unit 22, and the display controller 23.

The image acquisition unit 21 acquires a medical image G0 that is a processing target from the image storage server 3 in response to an instruction from the input device 15 by an operator. In the present embodiment, the medical image G0 is the CT image including the plurality of tomographic images including the abdomen of the human body. The medical image G0 is an example of an input image according to the present disclosure.

The feature amount derivation unit 22 derives a feature amount related to the medical image G0. In the present embodiment, the feature amount related to the medical image G0 represents an evaluation result of an abnormality included in the medical image G0. The evaluation result includes at least one of a region of a lesion included in the medical image G0, a probability that the lesion is a specific disease (for example, cancer), the presence or absence of the lesion, or a malignancy degree of the lesion. In the present embodiment, the region of the lesion included in the medical image G0 is derived as the feature amount related to the medical image G0.

Therefore, in the present embodiment, the feature amount derivation unit 22 includes n derivation models subjected to machine learning. In the present embodiment, as an example, first to third derivation models 22-1 to 22-3 are provided. In the present embodiment, the third derivation model 22-3 in the final stage derives a feature amount related to a lesion of a pancreas included in the medical image G0. The first derivation model 22-1 and the second derivation model 22-2 derive feature amounts related to regions other than the lesion of the pancreas. In particular, the second derivation model 22-2 in the previous stage of the third derivation model 22-3 in the final stage derives a feature amount representing at least one of a property or a shape of the region other than the lesion of the pancreas.

Figure 4:
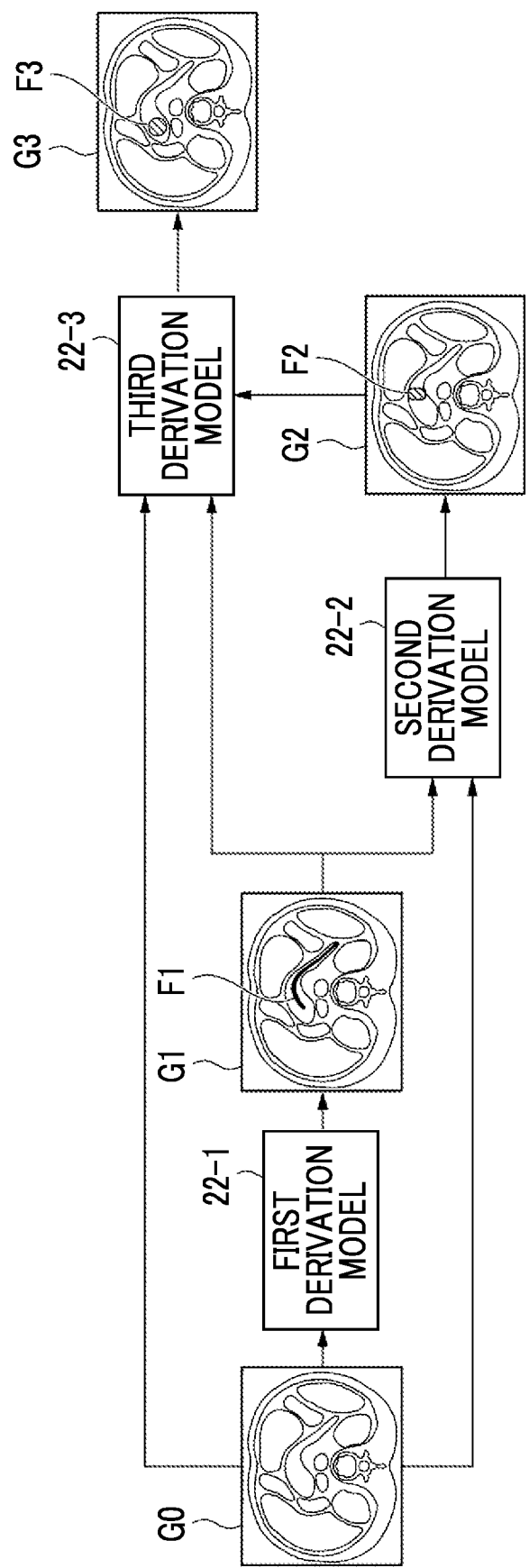
FIG. 4 is a diagram schematically showing processing performed by a feature amount derivation unit.

FIG. 4 is a diagram schematically showing processing performed by the feature amount derivation unit 22. First, in the first derivation model 22-1, a feature amount related to a predetermined part of a target organ included in the medical image G0 is derived as a first feature amount F1. In the present embodiment, the target organ is the pancreas, and the predetermined part is a pancreatic duct. In the present embodiment, the first derivation model 22-1 derives a region of the pancreatic duct in the pancreas as the first feature amount F1. In FIG. 4, the derivation of the first feature amount F1 via the first derivation model 22-1 is shown by an output image G1 in which the region of the pancreatic duct that is the first feature amount F1 is masked in the medical image G0 and a reference numeral F1 is assigned to the mask.

The second derivation model 22-2 derives a second feature amount F2 representing a region of a pancreatic duct stenosis based on the medical image G0 and the first feature amount F1 derived by the first derivation model 22-1. The region of the pancreatic duct stenosis represents at least one of the property or the shape of the pancreatic duct. In particular, the stenosis represents a shape of the pancreatic duct. In FIG. 4, the derivation of the second feature amount F2 via the second derivation model 22-2 is shown by an output image G2 in which the region of the pancreatic duct stenosis that is the second feature amount F2 is masked in the medical image G0 and a reference numeral F2 is assigned to the mask.

The third derivation model 22-3 derives an evaluation result of the lesion of the pancreas as a third feature amount F3 based on the medical image G0 and the second feature amount F2 derived by the second derivation model 22-2. In FIG. 4, the derivation of the third feature amount F3 via the third derivation model 22-3 is shown by an output image G3 in which the region of the lesion of the pancreas that is the third feature amount F3 is masked in the medical image G0 and a reference numeral F3 is assigned to the mask. The third feature amount F3 is an example of a feature amount related to the input image according to the present disclosure. In the present embodiment, the evaluation result of the lesion of the pancreas is defined as the region of the lesion of the pancreas, but the present disclosure is not limited to this. The evaluation result need only be at least one of the probability that the lesion is the specific disease (for example, cancer), the presence or absence of the lesion, or the malignancy degree of the lesion.

Here, in a case in which the doctor interprets the medical image G0 to specify the lesion of the pancreas, the indirect finding representing a change in the property and the shape of a peripheral tissue of the lesion, such as pancreatic duct stenosis, is used as a clue. It should be noted that the "indirect" of the indirect finding is an expression in a sense that contrasts with a case in which the lesion, such as a tumor, is expressed as a "direct" finding that is directly connected to the disease, such as the cancer. Also, in order to specify the pancreatic duct stenosis, the pancreatic duct in the pancreas is used as a clue. Here, the region of the pancreatic duct stenosis is an independent region separate from the region of the lesion of the pancreas, but is a region that serves as a basis for the specification of the region of the lesion of the pancreas. In addition, the region of the pancreatic duct is an independent region separate from the region of the pancreatic duct stenosis, but is a region that serves as a basis for the specification of the pancreatic duct stenosis.

Therefore, the first feature amount F1, which is the region of the pancreatic duct derived by the first derivation model 22-1, is an example of a feature amount related to another region that is independent of the region of the pancreatic duct stenosis from which the second feature amount F2 is derived, which suggests the second feature amount F2 which is the region of the pancreatic duct stenosis derived by the second derivation model 22-2, and that serves as a basis for the derivation of the second feature amount F2. In addition, the second feature amount F2, which is the region of the pancreatic duct stenosis derived by the second derivation model 22-2, is an example of a feature amount related to another region that is independent of the region of the lesion of the pancreas related to the third feature amount F3, which suggests the third feature amount F3 derived by the third derivation model 22-3, and that serves as a basis for the derivation of the third feature amount F3.

Next, the first derivation model 22-1, the second derivation model 22-2, and the third derivation model 22-3 will be described.

The first derivation model 22-1 is constructed by a neural network subjected to machine learning to derive the region of the pancreatic duct as the first feature amount F1 by extracting the region of the pancreatic duct in the medical image G0. For example, the first derivation model 22-1 is constructed by a convolutional neural network (CNN), such as residual networks (ResNet) or U-shaped networks (U-Net).

It should be noted that the extraction of the region of the pancreatic duct from the medical image G0 is not limited to the extraction using the neural network. Any method of extracting the region of the pancreatic duct from the medical image G0, such as template matching or threshold value processing for a CT value, can be applied.

The second derivation model 22-2 is a neural network subjected to machine learning to derive the region of the pancreatic duct stenosis as the second feature amount F2 by extracting the region of the pancreatic duct stenosis in the medical image G0 based on the medical image G0 and the first feature amount F1 (that is, the region of the pancreatic duct). The region of the pancreatic duct stenosis represents a feature of the shape of the pancreatic duct that the pancreatic duct undergoes the stenosis.

Figure 5:
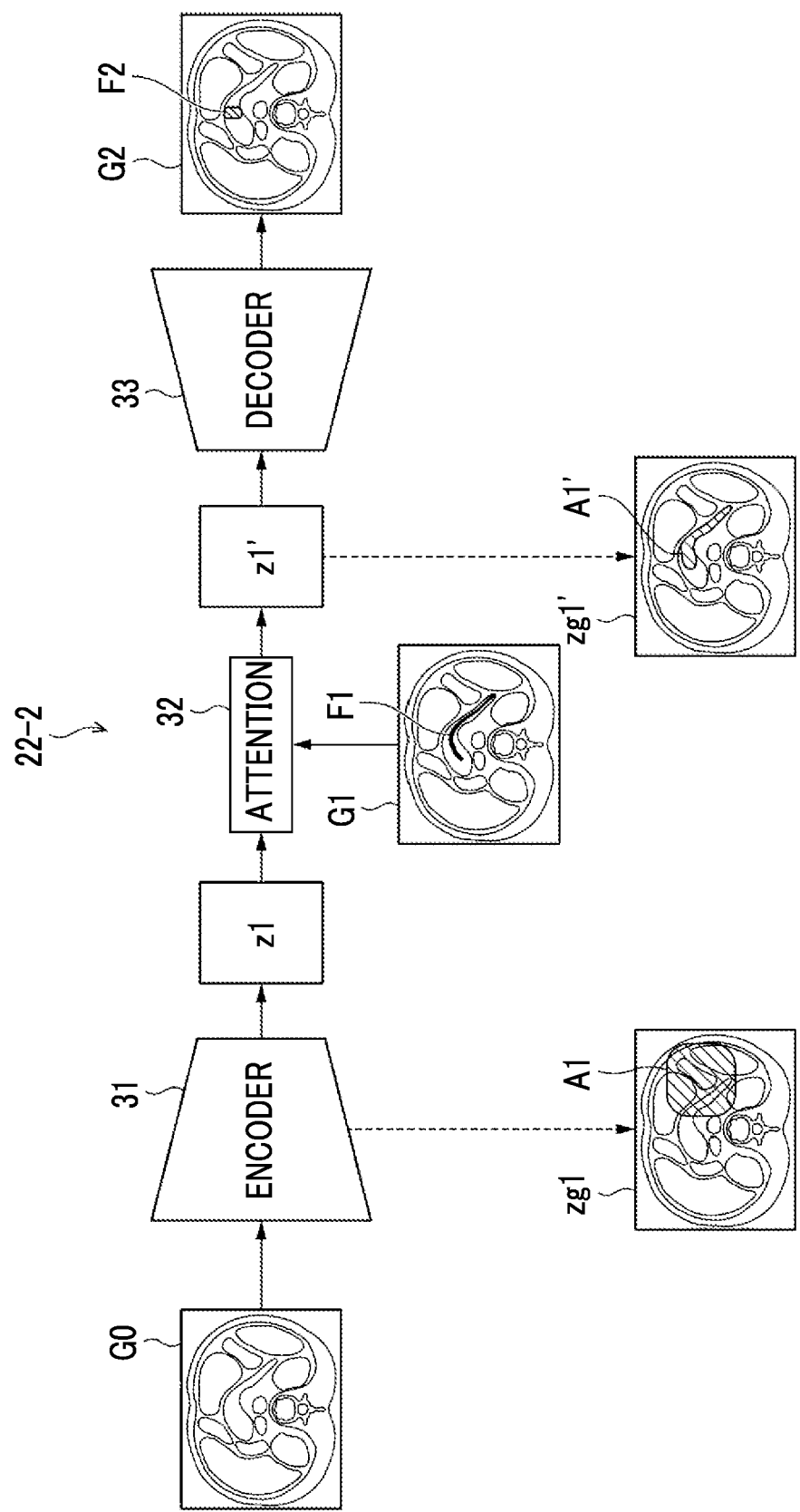
FIG. 5 is a diagram schematically showing processing performed by a second derivation model.

FIG. 5 is a diagram schematically showing processing performed by the second derivation model 22-2. As shown in FIG. 5, the second derivation model 22-2 includes an encoder 31, an attention 32, and a decoder 33. In a case in which the medical image G0 is input, the encoder 31 outputs a latent expression z1 in which a feature of the medical image G0 for extracting the region of the pancreatic duct stenosis is dimensionally compressed. The second derivation model 22-2 derives the region of the pancreatic duct stenosis as the second feature amount F2. For this reason, the latent expression z1 includes a feature for a region that serves as a basis for the extraction of the region of the pancreatic duct stenosis.

Here, in a case in which the doctor interprets the medical image G0 to find the pancreatic duct stenosis, a change in a property or a shape of the pancreatic duct is used as a clue. Therefore, the region that serves as the basis for the extraction of the region of the pancreatic duct stenosis is the region of the pancreatic duct. FIG. 5 shows an image zg1 that visualizes the region that serves as the basis for the extraction of the region of the pancreatic duct stenosis derived from the encoder 31. In the image zg1, regions of the pancreatic duct and the vicinity thereof in the medical image G0 are extracted as a region A1 that serves as the basis. It should be noted that the region A1 may be extracted by masking the region A1 or may be extracted by surrounding the region A1 with a bounding box.

The attention 32 in the second derivation model 22-2 derives a latent expression z1' corrected by correcting the latent expression z1 derived by the encoder 31 based on the first feature amount F1 derived by the first derivation model 22-1. Specifically, the corrected latent expression z1' is derived by emphasizing the region of the pancreatic duct in the latent expression z1. Examples of the emphasis method include a method of multiplying the region of the pancreatic duct in the latent expression z1 by a weight greater than 1, which is predetermined, based on the first feature amount F1. FIG. 5 shows an image zg1' that visualizes the corrected latent expression z1'. In the image zg1', the region of the pancreatic duct in the medical image G0 is shown as an emphasized region A1'.

The decoder 33 reconstructs the corrected latent expression z1' to extract the region of the pancreatic duct stenosis in the medical image G0 and derive the second feature amount F2. In FIG. 5 as well, the derivation of the second feature amount F2 via the second derivation model 22-2 is shown by the output image G2 in which the region of the pancreatic duct stenosis that is the second feature amount F2 is masked in the medical image G0 and the reference numeral F2 is assigned to the mask.

The third derivation model 22-3 is a neural network subjected to machine learning to derive the region of the lesion as the third feature amount F3 by extracting the region of the lesion of the pancreas in the medical image G0 based on the medical image G0 and the second feature amount F2 (that is, the region of the pancreatic duct stenosis).

Figure 6:
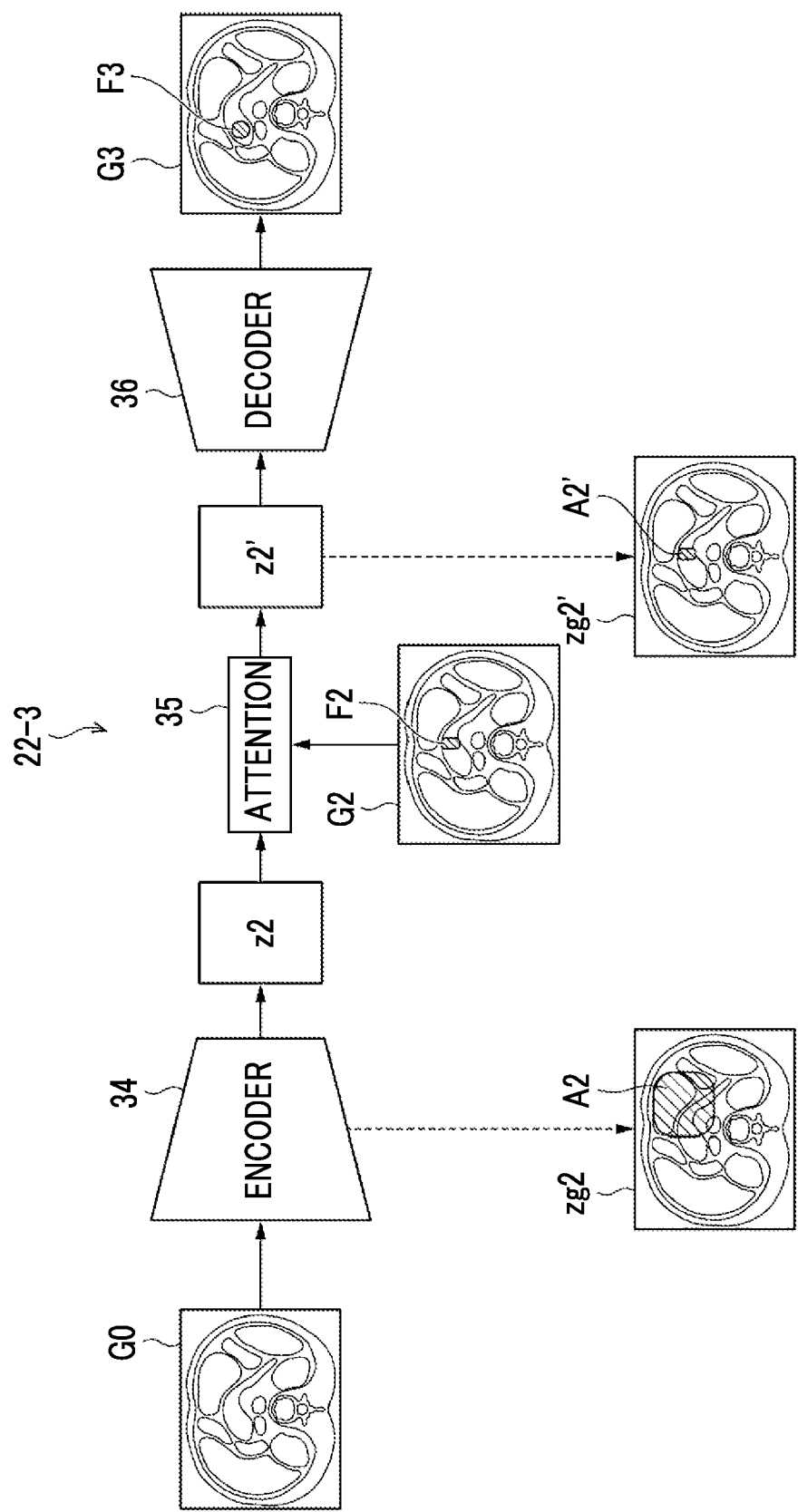
FIG. 6 is a diagram schematically showing processing performed by a third derivation model.

FIG. 6 is a diagram schematically showing processing performed by the third derivation model 22-3. As shown in FIG. 6, the third derivation model 22-3 includes an encoder 34, an attention 35, and a decoder 36. In a case in which the medical image G0 is input, the encoder 34 outputs a latent expression z2 in which the feature of the medical image G0 for extracting the region of the lesion of the pancreas is dimensionally compressed. The third derivation model 22-3 derives an extraction result of the region of the lesion of the pancreas as the third feature amount F3. For this reason, the latent expression z2 includes a feature for a region that serves as a basis for the extraction of the region of the lesion of the pancreas.

Here, in a case in which the doctor interprets the medical image G0 to find the lesion in the pancreas, the region of the pancreatic duct stenosis in the pancreas is used as a clue. Therefore, the region that serves as the basis for the extraction of the region of the lesion of the pancreas is the region of the pancreatic duct stenosis. FIG. 6 shows an image zg2 that visualizes the region that serves as the basis for the extraction of the region of the lesion of the pancreas derived from the encoder 34. In the image zg2, the region in the vicinity of the pancreatic duct stenosis in the medical image G0 is extracted as a region A2 that serves as the basis. It should be noted that the region A2 may be extracted by masking the region A2 or may be extracted by surrounding the region A2 with a bounding box.

The attention 35 in the third derivation model 22-3 derives a latent expression z2' corrected by correcting the latent expression z2 derived by the encoder 34 based on the second feature amount F2 derived by the second derivation model 22-2. Specifically, the corrected latent expression z2' is derived by emphasizing the region of the pancreatic duct stenosis in the latent expression z2. Examples of the emphasis method include a method of multiplying the region of the pancreatic duct stenosis in the latent expression z2 by a weight greater than 1, which is predetermined, based on the second feature amount F2. FIG. 6 shows an image zg2' that visualizes the corrected latent expression z2'. In the image zg2', the region of the pancreatic duct stenosis in the medical image G0 is shown as an emphasized region A2'.

The decoder 36 reconstructs the corrected latent expression z2' to derive the region of the lesion of the pancreas in the medical image G0 as the third feature amount F3 and output the output image G3 in which the region of the lesion of the pancreas is labeled.

Figure 7:
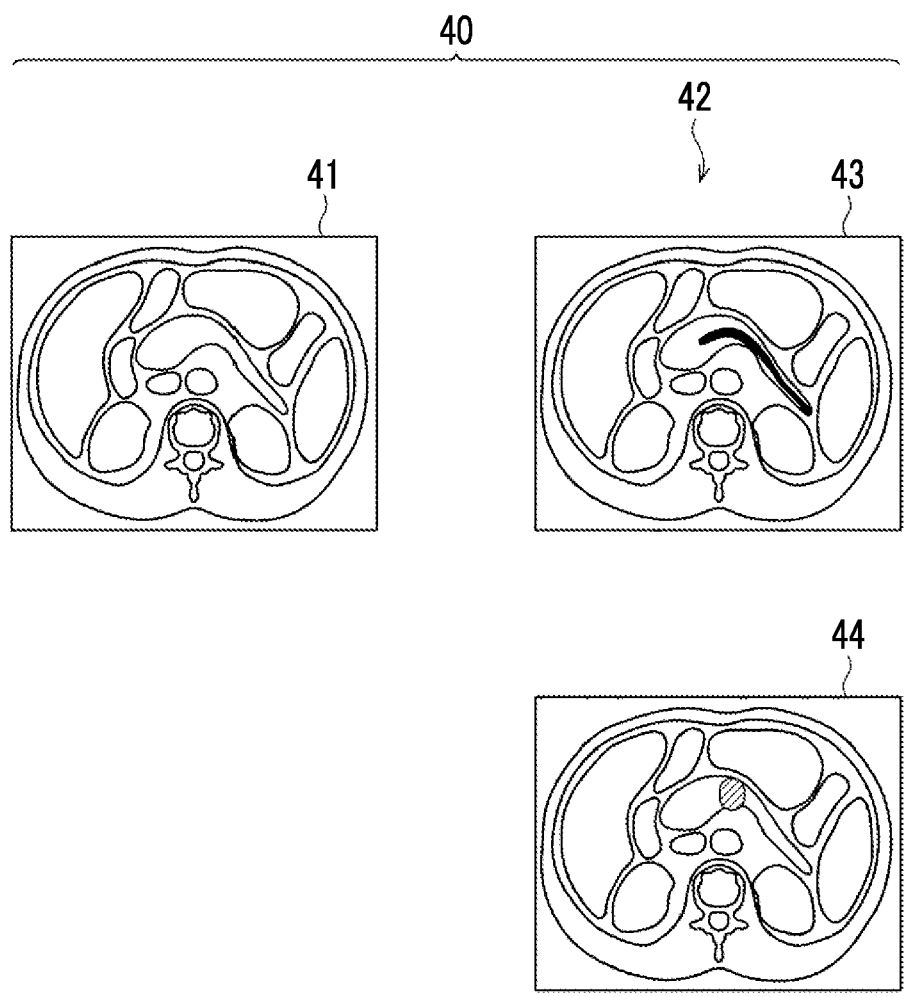
FIG. 7 is a diagram showing teacher data used for training the second derivation model.
Figure 8:
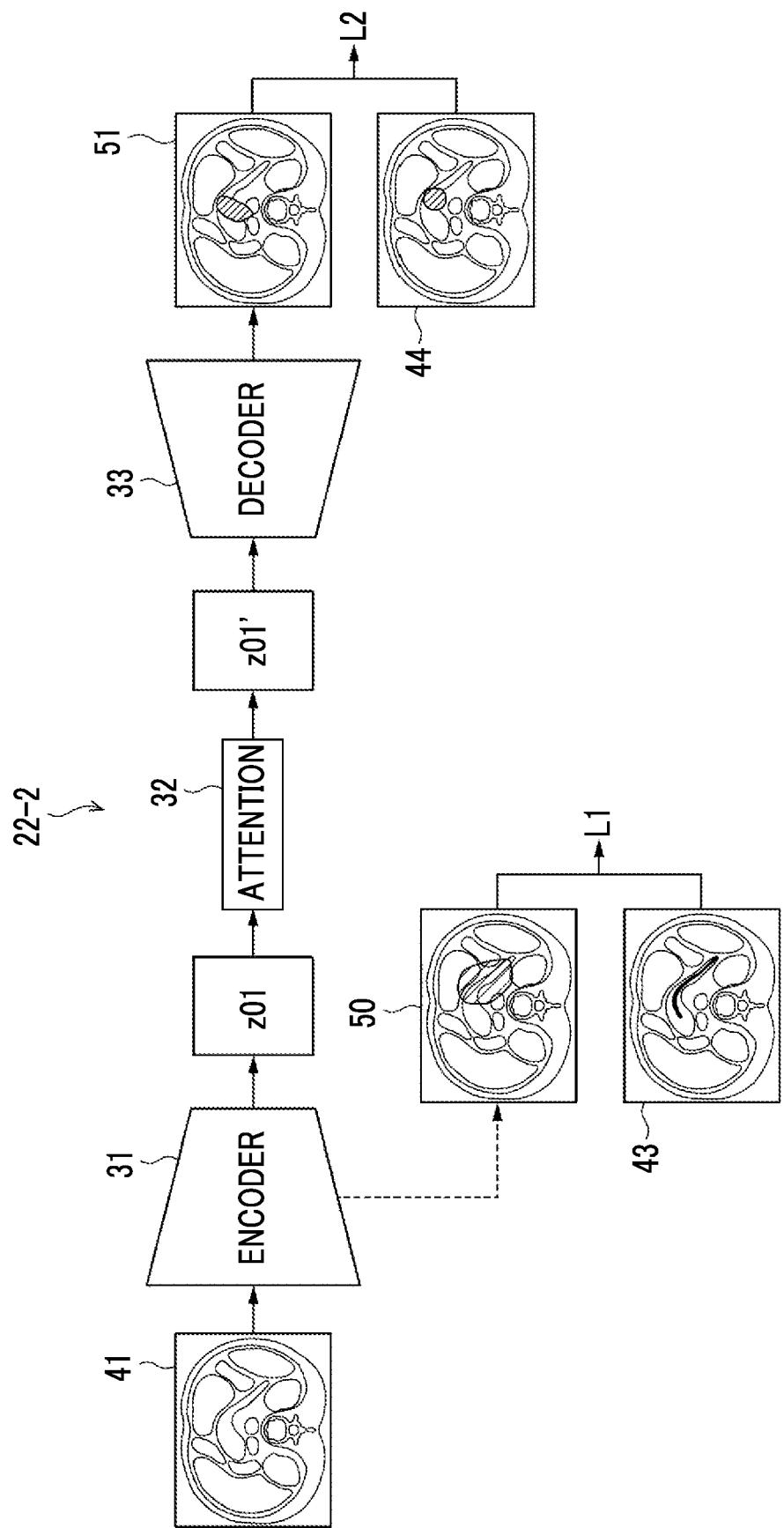
FIG. 8 is a diagram for describing the training of the second derivation model.

Hereinafter, training of the second derivation model 22-2 and the third derivation model 22-3 will be described. FIG. 7 is a diagram showing teacher data used for the training of the second derivation model 22-2, and FIG. 8 is a diagram for describing the training of the second derivation model 22-2. As shown in FIG. 7, teacher data 40 includes a medical image for training 41 and correct answer data 42. The medical image for training 41 is the medical image including the pancreas. The correct answer data 42 includes a first mask image 43 in which the region of the pancreatic duct in the medical image for training 41 is masked, and a second mask image 44 in which the region of the pancreatic duct stenosis in the medical image for training 41 is masked. It should be noted that the first mask image 43 may be the first mask image 43 derived by the first derivation model 22-1, or may be the correct answer data in a case of training the first derivation model 22-1.

In a case of the training, as shown in FIG. 8, first, the medical image for training 41 is input to the encoder 31, and a latent expression z01 in which the feature of the medical image for training 41 for extracting the region of the pancreatic duct stenosis from the encoder 31 is dimensionally compressed is output. The second derivation model 22-2 extracts the region of the pancreatic duct stenosis by focusing on the region of the pancreatic duct. Therefore, an image 50 that visualizes the region that serves as the basis for the extraction of the region of the pancreatic duct stenosis derived in the encoder 31 is derived, and a difference between the image 50 and the first mask image 43 that is the correct answer data 42 is derived as a loss L1. It should be noted that the medical image for training 41 may be input to the first derivation model 22-1 to output the first feature amount F1, and a difference between a value obtained by adding the first mask image 43 and the first feature amount F1, instead of the first mask image 43, and the image 50 may be derived as the loss L1.

It should be noted that the image 50 need only be derived by configuring the encoder 31 to have an output layer that visualizes the region that serves as the basis for the extraction of the region of the pancreatic duct stenosis which is derived. In addition, without providing, in the encoder 31, the output layer for visualizing the region that serves as the basis for the extraction of the region of the pancreatic duct stenosis, the region that serves as the basis for the extraction of the region of the pancreatic duct stenosis may be visualized by using a method of gradient-weighted class activation mapping (Grad-CAM).

Further, the latent expression z01 output from the encoder 31 is corrected by the attention 32 so that the region of the pancreatic duct is emphasized based on the first mask image 43, and a latent expression z01' which is corrected is derived. It should be noted that the latent expression z01 may be emphasized based on the first mask image 43 and the first feature amount F1 derived by the first derivation model 22-1. Then, the corrected latent expression z01' is reconstructed by the decoder 33, the region of the pancreatic duct stenosis in the medical image for training 41 is derived as the second feature amount, and an output image 51 in which the second feature amount is masked is derived. The output image 51 is an image in which the region of the pancreatic duct stenosis in the medical image for training 41 derived by the second derivation model 22-2 during the training is masked. Then, a difference between the output image 51 and the second mask image 44 is derived as a loss L2.

Then, the encoder 31, the attention 32, and the decoder 33 are trained so that the losses L1 and L2 are reduced. It should be noted that the attention 32 is trained using the loss L1 so that the region of the pancreatic duct in the pancreas is more emphasized in the latent expression z01 output by the encoder 31. As the region of the pancreatic duct to be used in this case, the region of the pancreatic duct derived by the first derivation model 22-1 for the medical image for training 41 need only be used. Alternatively, the attention 32 may be trained so that the region of the pancreatic duct in the pancreas is further emphasized in the latent expression z01 output by the encoder 31 based on the region of the pancreatic duct derived by the first derivation model 22-1 for the medical image for training 41 and the region of the pancreatic duct which is the correct answer data in a case of training the first derivation model 22-1. As a result, the encoder 31 is trained to derive the latent expression representing the feature in which the region of the pancreatic duct is emphasized. The attention 32 is trained so that the region of the pancreatic duct in the pancreas is more emphasized in the latent expression output by the encoder 31. The decoder 33 is trained to extract the region of the pancreatic duct stenosis from the latent expression corrected by the attention 32. The second derivation model 22-2 is constructed by repeating the training until the losses L1 and L2 become equal to or less than a predetermined threshold value using a plurality of teacher data, or by repeating the training a predetermined number of times.

Figure 9:
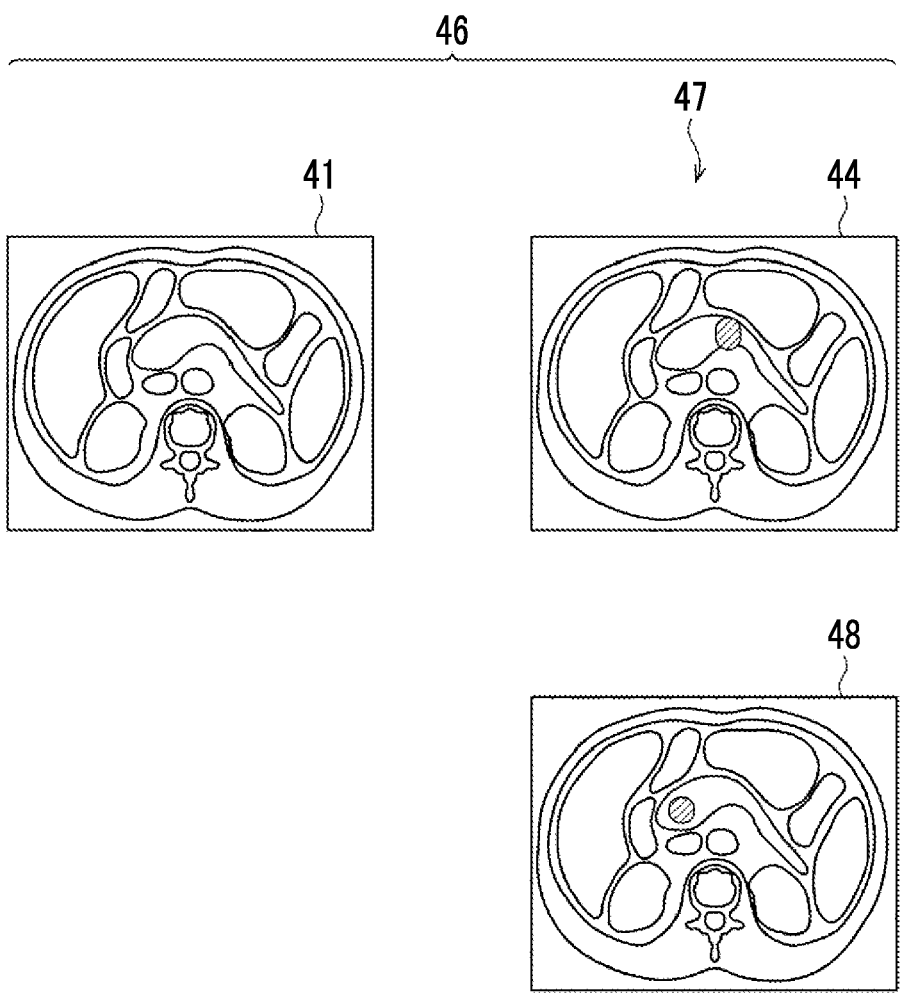
FIG. 9 is a diagram showing teacher data used for training the third derivation model.
Figure 10:
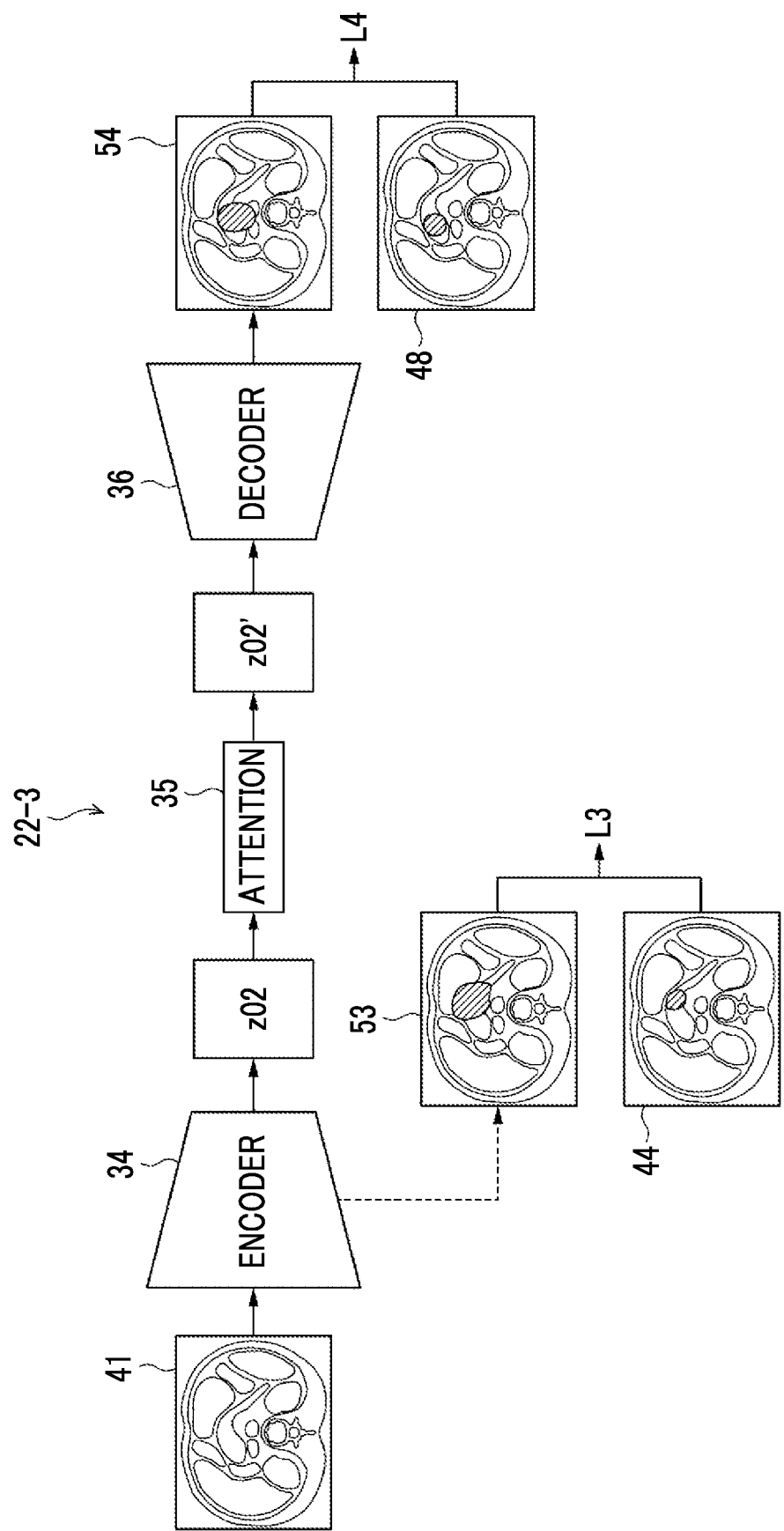
FIG. 10 is a diagram for describing the training of the third derivation model.

FIG. 9 is a diagram showing teacher data used for the training of the third derivation model 22-3, and FIG. 10 is a diagram for describing the training of the third derivation model 22-3. As shown in FIG. 9, teacher data 46 includes the medical image for training 41 and correct answer data 47. The medical image for training 41 is a medical image including the pancreas similar to the correct answer data 42 for training the second derivation model 22-2. The correct answer data 47 includes the second mask image 44 in which the region of the pancreatic duct stenosis in the medical image for training 41 is masked, and a third mask image 48 in which the region of the lesion of the pancreas in the medical image for training 41 is masked. The second mask image 44 is the same as the second mask image 44 included in the correct answer data 42 for training the second derivation model 22-2. It should be noted that the second mask image 44 may be derived by the second derivation model 22-2, or may be a combination of the second mask image 44 derived by the second derivation model 22-2 and the correct answer data in a case of training the second derivation model 22-2.

In a case of the training, as shown in FIG. 10, first, the medical image for training 41 is input to the encoder 34, and a latent expression z02 in which the feature of the medical image for training 41 for extracting the region of the lesion of the pancreas from the encoder 34 is dimensionally compressed is output. The third derivation model 22-3 extracts the lesion of the pancreas by focusing on the region of the pancreatic duct stenosis. Therefore, an image 53 that visualizes the region that serves as the basis for the extraction of the region of the lesion of the pancreas derived in the encoder 34 is derived, and a difference between the image 53 and the second mask image 44 that is the correct answer data 47 is derived as a loss L3. It should be noted that the second feature amount F2 may be output by the second derivation model 22-2, and a difference between a value obtained by adding the second mask image 44 and the second feature amount F2, instead of the second mask image 44, and the image 53 may be derived as the loss L3.

It should be noted that the image 53 need only be derived by configuring the encoder 34 to have an output layer that visualizes the region that serves as the basis for the extraction of the region of the lesion of the pancreas which is derived. In addition, without providing, in the encoder 34, the output layer for visualizing the region that serves as the basis for the extraction of the region of the lesion of the pancreas, the region that serves as the basis for the extraction of the region of the lesion of the pancreas may be visualized by using the method of the Grad-CAM.

Also, the latent expression z02 output from the encoder 34 is corrected by the attention 35 so that the region of the pancreatic duct stenosis is emphasized based on the second mask image 44, and a latent expression z02' which is corrected is derived. It should be noted that the latent expression z02 may be emphasized based on the second mask image 44 and the second feature amount F2 derived by the second derivation model 22-2. Then, the corrected latent expression z02' is reconstructed by the decoder 36, the region of the lesion of the pancreas in the medical image for training 41 is derived as the third feature amount, and an output image 54 in which the third feature amount is masked is derived. The output image 54 is an image in which the region of the lesion of the pancreas in the medical image for training 41 derived by the third derivation model 22-3 is masked. Then, a difference between the output image 54 and the third mask image 48 is derived as a loss L4.

Then, the encoder 34, the attention 35, and the decoder 36 are trained so that the losses L3 and L4 are reduced. It should be noted that the attention 35 is trained using the loss L3 so that the region of the pancreatic duct stenosis in the pancreas is emphasized in the latent expression z02 output by the encoder 34. As a result, the encoder 34 is trained to derive the latent expression representing the feature of the pancreatic duct stenosis. The attention 35 is trained so that the region of the pancreatic duct stenosis in the pancreas is emphasized. The decoder 36 is trained to extract the region of the lesion of the pancreas from the latent expression corrected by the attention 35. The third derivation model 22-3 is constructed by repeating the training until the losses L3 and L4 become equal to or less than a predetermined threshold value using a plurality of teacher data, or by repeating the training a predetermined number of times.

Figure 11:
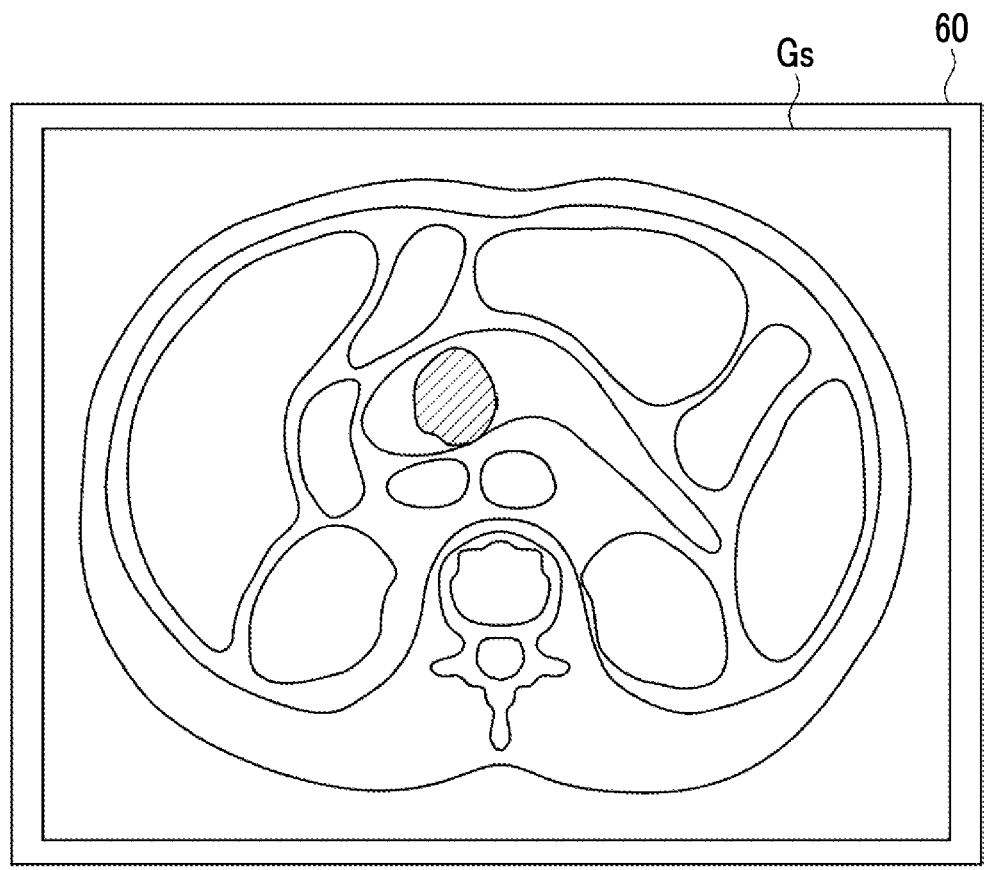
FIG. 11 is a diagram showing a display screen of an extraction result.

The display controller 23 displays, on the display 14, the output image in which the region of the feature amount derived by the feature amount derivation unit 22 is masked. FIG. 11 is a diagram showing a display screen of the output image. As shown in FIG. 11, an output image Gs based on the feature amount derived by the feature amount derivation unit 22 is displayed on a display screen 60. In the output image Gs, the region of the lesion of the pancreas is masked.

Figure 12:
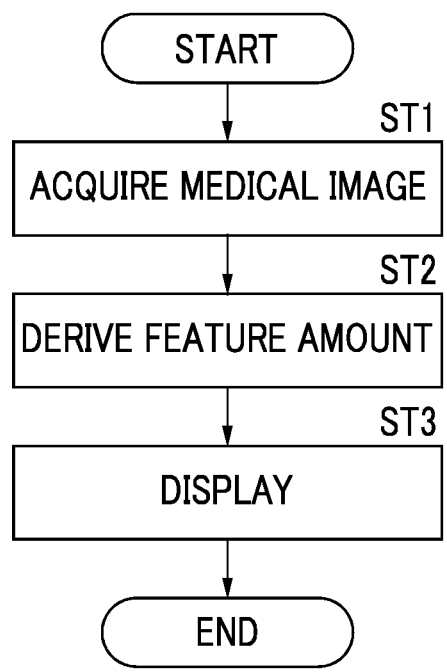
FIG. 12 is a flowchart showing processing performed in the present embodiment.

Hereinafter, processing performed in the present embodiment will be described. FIG. 12 is a flowchart showing the processing performed in the present embodiment. First, the image acquisition unit 21 acquires the medical image G0 from the storage 13 (step ST1), and the feature amount derivation unit 22 derives the feature amount of the medical image G0 (step ST2). Then, the display controller 23 displays the output image Gs in which the derived feature amount is masked on the display 14 (step ST3), and terminates the processing.

As described above, in the present embodiment, in a case of deriving the feature amount related to the medical image G0 which is the input image based on the first to nth (n≥2) derivation models, a kth (1<k≤n) derivation model derives a kth feature amount based on the medical image G0 and a k−1th feature amount derived by a k−1th derivation model. The k−1th feature amount includes a feature amount related to another region that is independent of a region related to the kth feature amount, which suggests the kth feature amount derived by the kth derivation model, and that serves as a basis for the derivation of the kth feature amount. Therefore, the kth feature amount is derived by the doctor focusing on the other region that suggests the lesion in a case of specifying the lesion. Therefore, according to the present embodiment, the feature of the input image can be detected accurately according to a method based on the thought of the person who views the input image, such as the doctor.

In addition, by causing the kth derivation model to correct the region that serves as the basis for the derivation of the kth feature amount based on the k−1th feature amount, the feature of the input image can be detected accurately according to the method based on the thought of the person who views the input image.

It should be noted that, in the embodiment described above, the first derivation model 22-1 derives the region of the pancreatic duct as the first feature amount F1, the second derivation model 22-2 derives the region of the pancreatic duct stenosis as the second feature amount F2, and the third derivation model 22-3 derives the region of the lesion of the pancreas as the third feature amount F3, but the present disclosure is not limited to this. For example, the first derivation model 22-1 may derive a result of dividing the pancreas into a head portion, a body portion, and a caudal portion as the first feature amount F1, the second derivation model 22-2 may derive information representing a part having the change in the property and the shape out of the head portion, the body portion, and the caudal portion as the second feature amount F2, and the third derivation model 22-3 may derive the region of the lesion of the pancreas as the third feature amount F3.

In addition, in the embodiment described above, although the kth feature amount represents the feature in the same pancreas, the kth feature amount may represent a feature of a structure other than the pancreas. For example, in a case in which the nth derivation model in the final stage derives the region of the lesion of the pancreas as the nth feature amount, another derivation model other than the nth derivation model may derive a feature amount representing a feature of at least one of a property or a shape of a structure other than the pancreas, such as a viscera and a blood vessel adjacent to the pancreas.

In addition, in the embodiment described above, the feature amount derivation unit 22 includes the three derivation models 22-1 to 22-3, but the present disclosure is not limited to this. The feature amount derivation unit 22 may include two derivation models or may include four or more derivation models. In a case in which the two derivation models are provided, for example, the first derivation model need only derive the region of the pancreatic duct stenosis from the medical image G0 as the first feature amount, and the second derivation model need only derive the region of the lesion of the pancreas in the medical image G0 as the second feature amount based on the medical image G0 and the first feature amount that is the region of the pancreatic duct stenosis, similarly to the third derivation model 22-3 in the embodiment described above.

It should be noted that, in a case in which the four or more derivation models are used, the k−1th (1<k≤n) feature amount need only include the feature amount related to the other region that is independent of the region related to the kth feature amount, which suggests the kth feature amount derived by the kth derivation model, and that serves as the basis for the derivation of the kth feature amount. It should be noted that the kth feature amount and the feature amount other than the k−1th feature amount may represent the same feature. For example, in a case in which the feature amount derivation unit 22 derives the region of the lesion of the pancreas as the feature amount, the n−1th feature amount may be the region of the pancreatic duct stenosis and the n−3th feature amount may also be the region of the pancreatic duct stenosis.

In addition, in the embodiment described above, the medical image G0 may be displayed on the display 14 by emphasizing the other region that serves as the basis for the derivation of the kth feature amount. For example, as shown in FIG. 13, in a case in which the second derivation model 22-2 derives the second feature amount F2, the image zg1 in which the region that serves as the basis for the extraction of the region of the pancreatic duct stenosis derived by the encoder 31 is visualized may be displayed on the display 14. In this case, the image zg1 need only be derived by configuring the encoder 31 to have the output layer that visualizes the region that serves as the basis for the extraction of region of the pancreatic duct stenosis. In addition, without providing, in the encoder 31, the output layer for visualizing the region that serves as the basis for the extraction of the region of the pancreatic duct stenosis, the region that serves as the basis for the extraction of the region of the pancreatic duct stenosis may be visualized by using the method of the Grad-CAM. It should be noted that an image in which the first feature amount F1 in the medical image G0, that is, the region of the pancreatic duct is emphasized may be displayed together with the image zg1.

It should be noted that, in a case in which the third derivation model 22-3 derives the third feature amount F3, the display 14 may display the image zg2 that visualizes the region that serves as the basis for the extraction of the region of the lesion of the pancreas derived by the encoder 34. In this case, the image zg2 need only be derived by configuring the encoder 34 to have the output layer that visualizes the region that serves as the basis for the extraction of the region of the lesion of the pancreas. In addition, without providing, in the encoder 34, the output layer for visualizing the region that serves as the basis for the extraction of the region of the lesion of the pancreas, the region that serves as the basis for the extraction of the region of the lesion of the pancreas may be visualized by using the method of the Grad-CAM. It should be noted that an image in which the second feature amount F2 in the medical image G0, that is, the region of the pancreatic duct stenosis is emphasized may be displayed together with the image zg2.

In addition, in the embodiment described above, the target organ is the pancreas, but the present disclosure is not limited to this. In addition to the pancreas, any organ, such as the brain, the heart, the lung, and the liver, can be used as the target organ.

In addition, in the embodiment described above, the CT image is used as the medical image G0, but the present disclosure is not limited to this. In addition to the three-dimensional image, such as the MRI image, any image, such as a radiation image acquired by simple imaging, can be used as the medical image G0.

In addition, in the embodiment described above, various processors shown below can be used as the hardware structure of the processing units that execute various types of processing, such as the image acquisition unit 21, the feature amount derivation unit 22, and the display controller 23. As described above, the various processors include, in addition to the CPU that is a general-purpose processor which executes software (program) to function as various processing units, a programmable logic device (PLD) that is a processor of which a circuit configuration can be changed after manufacture, such as a field programmable gate array (FPGA), and a dedicated electrical circuit that is a processor having a circuit configuration which is designed for exclusive use to execute a specific processing, such as an application specific integrated circuit (ASIC).

One processing unit may be configured by one of these various processors or may be configured by a combination of two or more processors of the same type or different types (for example, a combination of a plurality of FPGAs or a combination of the CPU and the FPGA). In addition, a plurality of the processing units may be configured by one processor.

As an example of configuring the plurality of processing units by one processor, first, as represented by a computer of a client, a server, and the like there is an aspect in which one processor is configured by a combination of one or more CPUs and software and this processor functions as a plurality of processing units. Second, as represented by a system on chip (SoC) or the like, there is an aspect of using a processor that realizes the function of the entire system including the plurality of processing units by one integrated circuit (IC) chip. In this way, as the hardware structure, the various processing units are configured by using one or more of the various processors described above.

Further, as the hardware structures of these various processors, more specifically, it is possible to use an electrical circuit (circuitry) in which circuit elements, such as semiconductor elements, are combined.

What is claimed is:

1. An image processing apparatus comprising:
at least one processor,
wherein the processor
derives a feature amount related to an input image based on first to nth (n≥2) derivation models,
derives, via the first derivation model, a first feature amount based on the input image, and
derives, via a kth (1<k≤n) derivation model, a kth feature amount based on the input image and a k−1th feature amount derived by a k−1th derivation model,
an nth feature amount derived by the nth derivation model is the feature amount related to the input image, and
the k−1th feature amount includes a feature amount related to another region that is independent of a region related to the kth feature amount, which suggests the kth feature amount derived by the kth derivation model, and that serves as a basis for the derivation of the kth feature amount.

2. The image processing apparatus according to claim 1, wherein the kth derivation model is trained to correct the region that serves as the basis for the derivation of the kth feature amount based on the k−1th feature amount.

3. The image processing apparatus according to claim 2, wherein the correction is emphasis.

4. The image processing apparatus according to claim 1, wherein the input image is a medical image, and
the feature amount related to the input image represents an evaluation result of an abnormality included in the medical image.

5. The image processing apparatus according to claim 4, wherein the evaluation result includes at least one of a region of a lesion included in the input image, a probability that the lesion is a specific disease, presence or absence of the lesion, or a malignancy degree of the lesion.

6. The image processing apparatus according to claim 5, wherein the k−1th feature amount derived by the k−1th derivation model includes a feature amount related to a region other than the lesion.

7. The image processing apparatus according to claim 6, wherein the feature amount related to the region other than the lesion is a feature amount that represents at least one of a property or a shape of the region other than the lesion.

8. The image processing apparatus according to claim 1, wherein the processor displays the input image by emphasizing the other region that serves as the basis for the derivation of the kth feature amount in the input image.

9. An image processing method comprising:
deriving a feature amount related to an input image based on first to nth (n≥2) derivation models;
deriving, via the first derivation model, a first feature amount based on the input image; and
deriving, via a kth (1<k≤n) derivation model, a kth feature amount based on the input image and a k−1th feature amount derived by a k−1th derivation model, wherein an nth feature amount derived by the nth derivation model is the feature amount related to the input image, and the k−1th feature amount includes a feature amount related to another region that is independent of a region related to the kth feature amount, which suggests the kth feature amount derived by the kth derivation model, and that serves as a basis for the derivation of the kth feature amount.

10. A non-transitory computer-readable storage medium that stores an image processing program causing a computer to execute:

a procedure of deriving a feature amount related to an input image based on first to nth (n≥2) derivation models;

a procedure of deriving, via the first derivation model, a first feature amount based on the input image; and a procedure of deriving, via a kth (1<k≤n) derivation model, a kth feature amount based on the input image and a k−1th feature amount derived by a k−1th derivation model, wherein an nth feature amount derived by the nth derivation model is the feature amount related to the input image, and the k−1th feature amount includes a feature amount related to another region that is independent of a region related to the kth feature amount, which suggests the kth feature amount derived by the kth derivation model, and that serves as a basis for the derivation of the kth feature amount.

* * * * *